(12) United States Patent
Ha

(10) Patent No.: US 6,801,566 B2
(45) Date of Patent: Oct. 5, 2004

(54) FORWARD POWER CONTROL APPARATUS AND METHOD FOR USE IN A MULTI-CARRIER COMMUNICATION SYSTEM

(75) Inventor: Ji-Won Ha, Seoul (KR)

(73) Assignee: Samsung Electronics Co., Ltd. (KR)

( * ) Notice: Subject to any disclaimer, the term of this patent is extended or adjusted under 35 U.S.C. 154(b) by 783 days.

(21) Appl. No.: 09/753,118

(22) Filed: Jan. 2, 2001

(65) Prior Publication Data

US 2001/0019577 A1 Sep. 6, 2001

(30) Foreign Application Priority Data

Dec. 31, 1999 (KR) ...................................... P1999-68121

(51) Int. Cl.[7] ................................................. H04B 1/69
(52) U.S. Cl. ...................................... 375/148; 375/130
(58) Field of Search ................................. 375/148, 130, 375/150, 149, 346, 316, 227, 367; 370/341, 252; 455/226.3, 67.3, 67.1

(56) References Cited

U.S. PATENT DOCUMENTS

| | | | |
|---|---|---|---|
| 5,559,790 A | 9/1996 | Yano et al. | 370/342 |
| 6,028,894 A | * 2/2000 | Oishi et al. | 375/227 |
| 6,442,152 B1 | * 8/2002 | Park et al. | 370/341 |
| 6,658,046 B1 | * 12/2003 | Miura | 375/148 |

* cited by examiner

Primary Examiner—Khai Tran
(74) Attorney, Agent, or Firm—Dilworth & Barrese, LLP

(57) ABSTRACT

A mobile station of the mobile communication system measures signal energy on a traffic channel and interference energy on a sync channel to calculate SIR, compares the calculated SIR with a threshold, and then transmits the comparison results to a base station for a forward power control operation. To this end, a PN despreader multiplies a received signal by a unique PN code and outputs a PN despread signal. An orthogonal code despreader multiplies the PN despread signal by a sync channel orthogonal code and a traffic channel orthogonal code and outputs first and second orthogonal code despread signals. An interference energy processor measures interference energy by processing the first orthogonal code despread signal. A signal energy processor measures signal energy by processing the second orthogonal code despread signal. An SIR calculator calculates SIR depending on the measured signal energy and interference energy. The calculated SIR is compared with a predetermined threshold and the compared results are transmitted to the base station for the forward power control operation.

35 Claims, 6 Drawing Sheets

FORWARD POWER CONTROL APPARATUS AND METHOD FOR USE IN A MULTI-CARRIER COMMUNICATION SYSTEM

PRIORITY

This application claims priority to an application entitled "Forward Power Control Apparatus and Method for Use in a Multi-Carrier Communication System" filed in the Korean Industrial Property Office on Dec. 31, 1999 and assigned Ser. No. 99-68121, the contents of which are hereby incorporated by reference.

BACKGROUND OF THE INVENTION

1. Field of the Invention

The present invention relates generally to forward power control in a mobile communication system, and in particular, to an apparatus and method for performing a forward power control operation in a mobile communication system supporting multiple carriers.

2. Description of the Related Art

In general, a CDMA mobile communication system such as a CDMA-2000 system uses orthogonal codes for channel separation. When the mobile communication system uses orthogonal codes in a channel environment where there is no multi-path, no interference occurs between the channels using the different orthogonal codes.

However, when the mobile communication system uses orthogonal codes in the multi-path channel environment, orthogonality is not maintained between the channels in the transmission signal components due to delay of the paths and some of the signals input to the respective fingers act as interferences. In practice, a signal-to-interference ratio (SIR) or a signal-to-noise ratio (SNR) is measured using the interference components, and utilized as useful information for forward power control. This is because if a reception SIR value of a mobile station (MS) is given, a base station (BS) can adaptively control transmission power of a signal transmitted to the mobile station. That is, when the reception SIR value of the mobile station is lower than a threshold, the base station judges that the mobile station is in a bad reception condition and then, increases transmission power of a signal transmitted to a specific mobile station. Otherwise, if the reception SIR value of the mobile station is higher than the threshold, the base station judges that the mobile station is in a good reception condition, and then, decreases the transmission power of the signal transmitted to the specific mobile station. Therefore, all in all, it is possible to optimize the power efficiency by reducing an amount of the base station transmission power allocated to a specific mobile station. As one example, shown in FIG. 1 is a system which can perform a forward power control operation by measuring the reception SIR value of the mobile station and then transmitting the measured results to the base station. The system of FIG. 1 is disclosed in U.S. Pat. No. 5,559,790, issued on Sep. 24, 1996, entitled "Spread Spectrum Communication System and Transmission Power Control Method Therefor", the contents of which are hereby incorporated by reference.

The forward power control system of FIG. 1, however, needs to exactly measure interference (or noise) signal power in order to measure an exact SIR value. In particular, such needs arise in a communication system having a plurality of carriers (hereinafter, referred to as a multi-carrier communication system) such as a CDMA-2000 system. This is because in the multi-carrier communication system, the channels are separately influenced according to the carriers and thus, the interference signal power can also vary according to the carriers. It is apparent that the forward power control system of FIG. 1 is designed considering a system having a single carrier rather than multiple carriers. Therefore, it is difficult to use the structure of FIG. 1 for forward power control operation of a multi-carrier communication system.

In addition, since the forward power control system of FIG. 1 performs despreading, accumulation and squaring on a pilot channel signal and a specific channel signal in order to measure the SIR value, channel utilization efficiency is decreased. Specifically, in FIG. 1, a PN despread signal output from a multiplier 304 is multiplied in a multiplier 310 by an orthogonal code $W_N$ generated by an orthogonal code generator 306 and is output as an orthogonal code despread signal. The orthogonal code despread signal is accumulated for a predetermined time by an accumulator 311, squared by a square unit 312, and then provided to a second input end of an S/N ratio measuring unit 316. The signal applied to the second input end of the S/N ratio measuring unit 316 is a noise power signal. In order to extract this noise power signal, the orthogonal code generator 306 should necessarily generate a specific orthogonal code which is not used in the base station during modulation of the transmission signal. In addition, the forward power control system of FIG. 1 performs despreading, accumulation and squaring on a pilot channel signal in order to measure a signal power value.

Since a noise power value measured by the S/N ratio measuring unit 316 is relatively much larger than a signal power value in real environment, it is difficult to perform an exact power control operation.

SUMMARY OF THE INVENTION

It is, therefore, an object of the present invention to provide a forward power control apparatus and method for use in a multi-carrier communication system.

It is another object of the present invention to provide a forward power control apparatus and method for guaranteeing efficient utilization of channels in a multi-carrier communication system.

It is further another object of the present invention to provide an apparatus and method for calculating SIR by measuring signal energy and interference energy for a forward power control operation in a multi-carrier communication system.

It is yet another object of the present invention to provide an apparatus and method for measuring interference energy without generating a separate orthogonal code.

To achieve the above and other objects, a mobile station of the mobile communication system measures signal energy on a traffic channel and interference energy on a sync channel to calculate SIR, compares the calculated SIR with a threshold, and then transmits the comparison results to a base station for a forward power control operation.

To this end, a PN despreader multiplies a received signal by a unique PN code and outputs a PN despread signal. An orthogonal code despreader multiplies the PN despread signal by a sync channel orthogonal code and a traffic channel orthogonal code and outputs first and second orthogonal code despread signals. An interference energy measurer measures interference energy by processing the first orthogonal code despread signal. A signal energy measurer measures signal energy by processing the second orthogonal code despread signal. An SIR calculator calculates SIR depending on the measured signal energy and interference energy. The calculated SIR is compared with a predetermined threshold and the compared results are transmitted to the base station for the forward power control operation.

Preferably, the PN despreader comprises a PN code generator for generating the PN code; and a mulipiler for multiplying the received signal by the PN code and outputting the PN despread signal.

Preferably, the orthogonal code despreader comprises an orthogonal code generator for generating the sync channel orthogonal code and the traffic channel orthogonal code; a first multiplier for multiplying the PN despread signal by the sync channel orthogonal code and outputting the first orthogonal code despread signal; and a second multiplier for multiplying the PN despread signal by the traffic channel orthogonal code and outputting the second orthogonal code despread signal.

Preferably, the interference energy measurer comprises an accumulator for accumulating the first orthogonal code despread signal; a subtracter for subtracting from each other values of two neighboring symbols in the signal accumulated by the accumulator; and a squarer for squaring the subtraction signal by the subtractor to measure the interference energy.

Preferably, the signal energy measurer comprises an accumulator for accumulating the second orthogonal code despread signal; and a power control bit extractor for extracting a power control bit from the signal accumulated by the accumulator and measuring a value of the extracted power control bit as the signal energy.

Further, the apparatus comprises a long code generator for informing the power control bit extractor of a position of the power control bit in the signal accumulated by the accumulator in order to enable the power control bit extractor to use information about the position in extracting the power control bit.

Preferably, the interference energy and the signal energy are measured in a unit of a power control group.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 2:
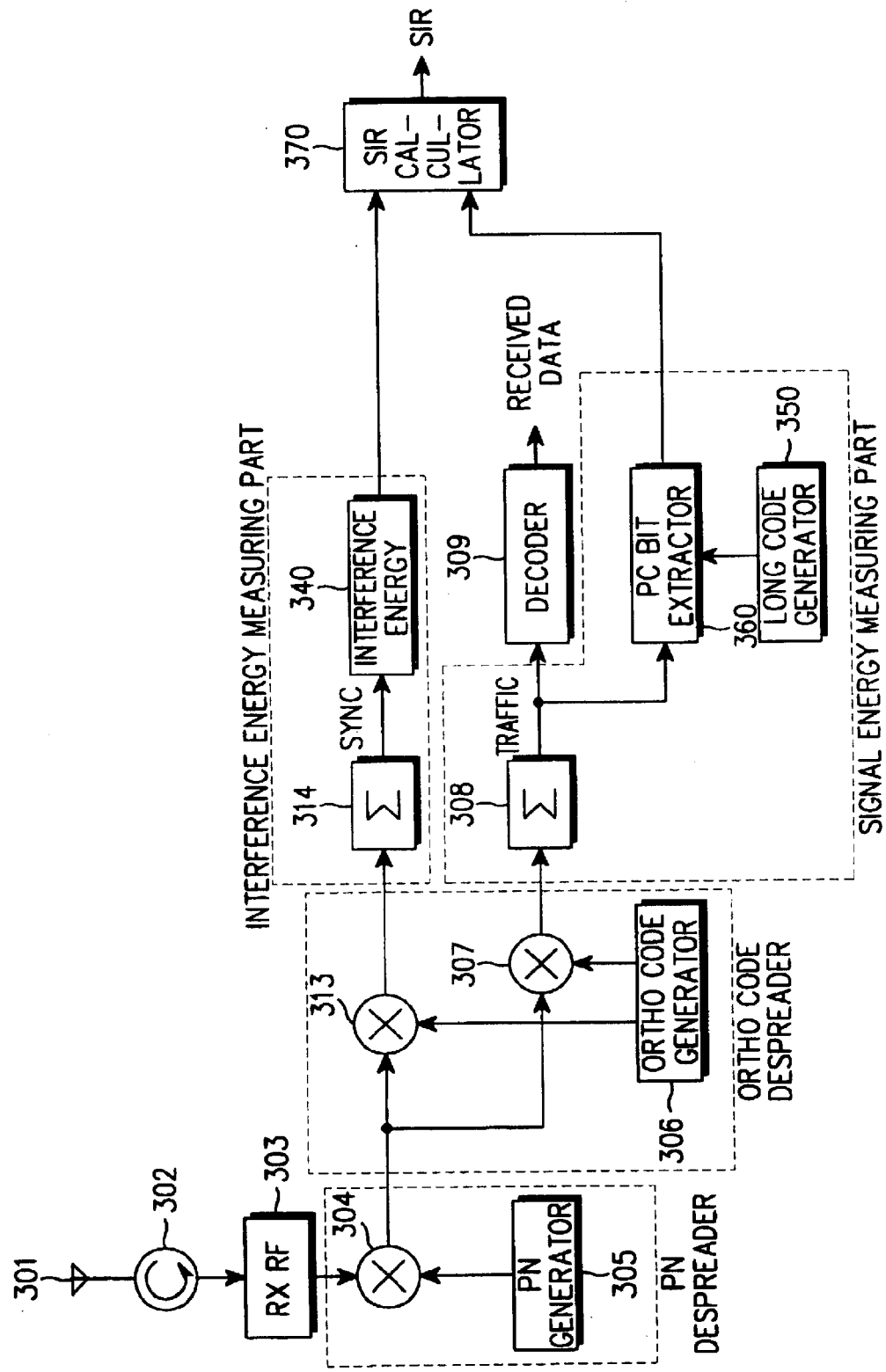
FIG. 2 is a block diagram illustrating an SIR calculation apparatus for a forward power control operation according to an embodiment of the present invention.
Figure 4:
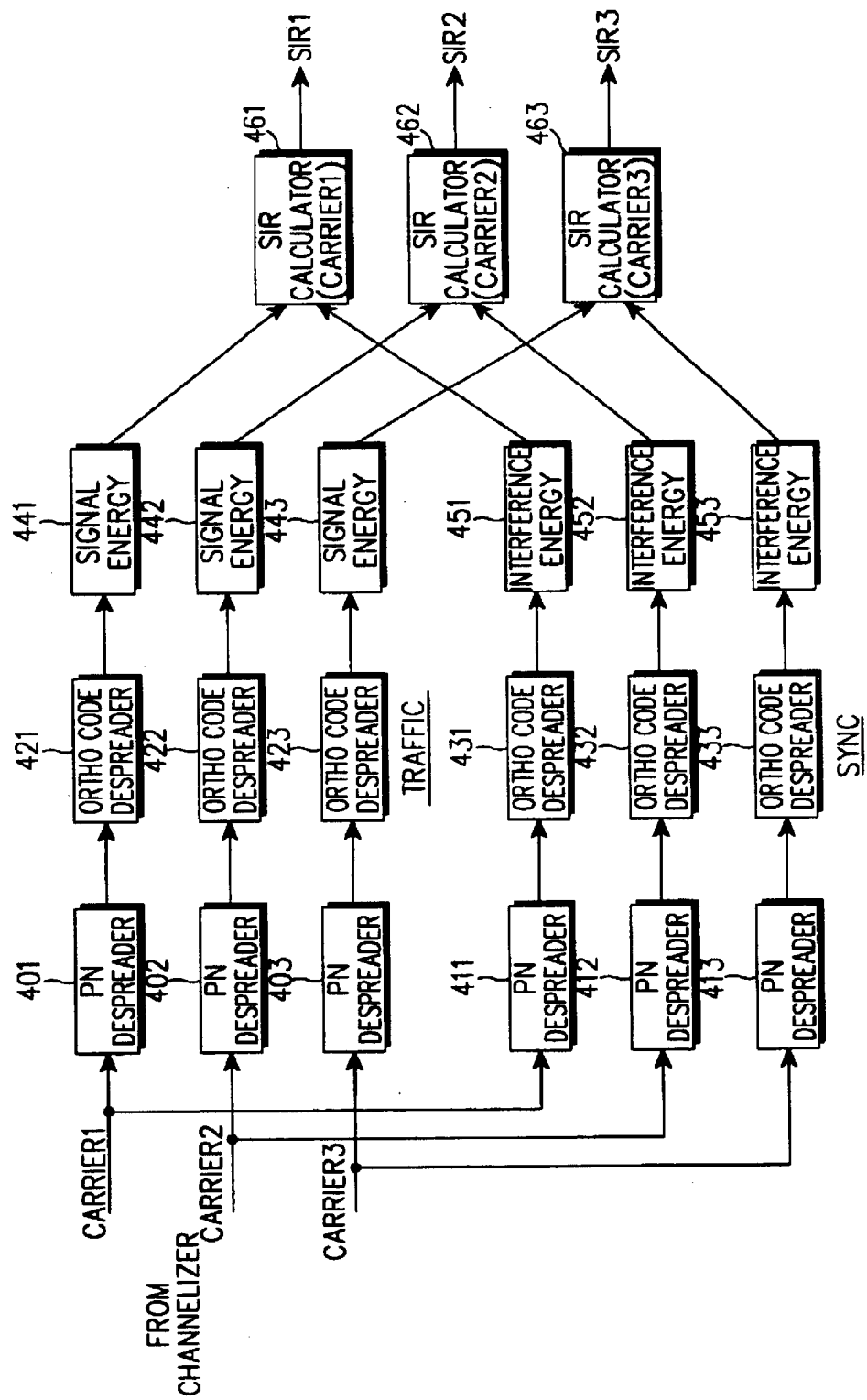
FIG. 4 is a block diagram illustrating an SIR calculating apparatus for a forward power control operation according to another embodiment of the present invention.
Figure 5:
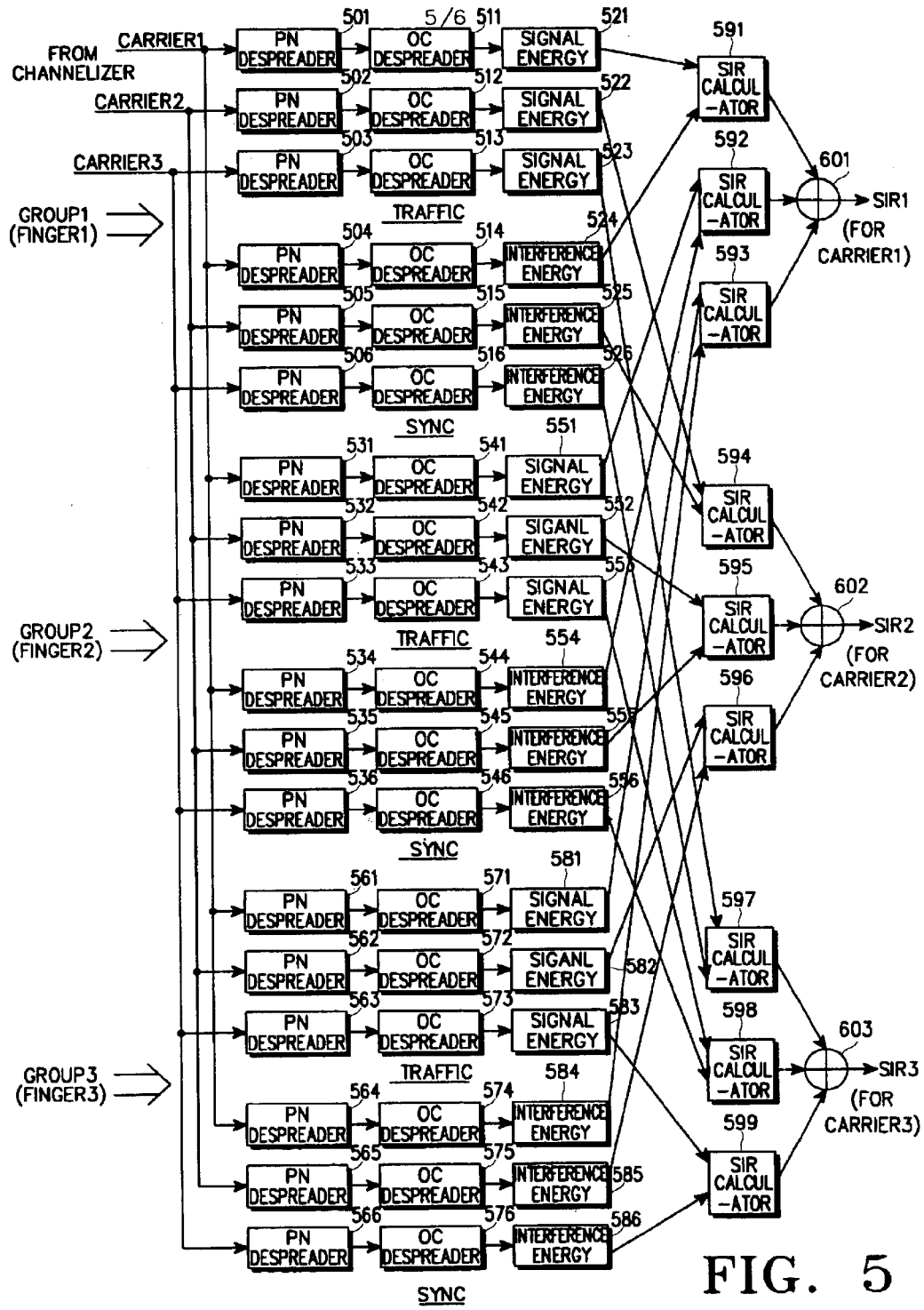
FIG. 5 is a block diagram illustrating an SIR calculating apparatus for a forward power control operation according to yet another embodiment of the present invention.

In a mobile communication system according to an embodiment of the resent invention, a mobile station measures signal energy on a traffic channel and interference energy on a sync channel to calculate SIR, compares the calculated SIR with a predetermined threshold, and then transmits the compared results to a base station, thereby performing a forward power control operation. The present invention can be applied not only to a mobile station of a multi-carrier communication system supporting a plurality of carriers but also to a mobile station of a multi-carrier communication system with a plurality of fingers, supporting a plurality of carriers. An apparatus for calculating SIR by measuring signal energy and interference energy can be implemented as shown in FIGS. 2, 4 and 5, and the SIR calculated by the apparatus is processed by the elements shown in FIG. 6, and then provided to a transmitter (specifically, an encoder) of the mobile station. The transmitter of the mobile station then transmits the SIR to the base station. In this way, the forward power control operation is performed.

FIG. 2 shows an apparatus for calculating SIR for a forward power control operation according to an embodiment of the present invention. Specifically, FIG. 2 shows an example where the apparatus is implemented in the mobile station of the general mobile communication system. The SIR calculation apparatus measures signal energy from a orthogonal code despread signal on a traffic channel and measures interference energy from a orthogonal code despread signal on a sync channel. Therefore, the orthogonal code generator 306 may generate only two orthogonal codes, rather than three as in FIG. 1.

Referring to FIG. 2, a signal received at an antenna 301 is applied to an RF (Radio Frequency) processor 303 through a circulator 302, which converts the received RF signal into a baseband spread spectrum signal. A multiplier 304 multiplies the baseband spread spectrum signal from the RF processor 303 by a PN code generated by a PN (Pseudo Noise) code generator 305 and outputs a PN despread signal. Here, the PN code generated by the PN code generator 305 is a unique signal for identifying the base station, and the multiplier 304 and the PN code generator 305 serve as a PN despreader for outputting a PN despread signal by multiplying the received signal from the RF processor 303 by the unique PN code.

A multiplier 313 multiplies the PN despread signal by a sync channel orthogonal code (or an orthogonal code for a sync channel) generated by the orthogonal code generator 306, and outputs a sync channel despread signal. A multiplier 307 multiplies the PN despread signal by a traffic channel orthogonal code (or an orthogonal code for a traffic channel) generated by the orthogonal code generator 306, and outputs a traffic channel despread signal. The orthogonal code generator 306 generates orthogonal codes such as Walsh codes for separating the sync channel and the traffic channel. The multipliers 313 and 307, and the orthogonal code generator 306 serve as an orthogonal code despreader for outputting a first (or sync channel) orthogonal code despread signal and a second (or traffic channel) orthogonal code despread signal by multiplying the PN despread signal by the sync channel orthogonal code and the traffic channel orthogonal code, respectively.

An accumulator 308 accumulates the second orthogonal code despread signal. A power control (PC) bit extractor 360 extracts a PC bit from the resultant signal accumulated by the accumulator 308 using a long code generated by a long code generator 350, and measures a value of the extracted PC bit as signal energy. That is, the accumulator 308, the long code generator 350 and the PC bit extractor 360 serve as a signal energy measurer for measuring signal energy by accumulating the second orthogonal code despread signal and extracting the PC bit value from the accumulated results. This signal energy measuring operation is performed in a unit of one power control group (PCG).

The signal energy measuring operation performed by the signal energy measurer will be described more specifically hereinbelow.

The PC bit is transmitted to the mobile station by the base station together with a signal for a power control operation, and this PC bit has a constant value regardless of variation in a data rate. Therefore, the invention utilizes the PC bit rather than other bits in order to measure accurate signal energy (or power). This PC bit may include 2 bits, and the position of the PC bit can be determined by the long code. For extraction of the PC bit, the PC bit extractor 360 uses a long code generated by the long code generator 350. The long code generated by the long code generator 350 is a code indicating a position of the PC bit in the resultant signal accumulated by the accumulator 308.

An accumulator 314 accumulates the first orthogonal code despread signal. An interference energy processor 340 is comprised of a subtractor (not shown) for subtracting from each other values of two neighboring symbols in the resultant signal accumulated by the accumulator 314 and a squarer (not shown) for squaring the subtracted results to measure interference energy. That is, the accumulator 314 and the interference energy processor 340 serve as an interference energy measurer for measuring the interference energy by performing accumulation, subtraction and squaring on the first orthogonal code despread signal. This interference energy measuring operation is also performed in a unit of one PCG.

The interference energy measuring operation performed by the interference energy measurer will be described more specifically hereinbelow.

The first orthogonal code despread signal, which is despread with the sync channel orthogonal code, has the same value at two neighboring symbols. This is because a modulated data rate of the sync channel is 4 times lower than a typically modulated data rate of the traffic channel. Therefore, considering the fact that the sync channel is divided into I and Q arms in the base station during transmission, the two neighboring symbols in the I or Q arm have the same value when observed at the data rate of the traffic channel. Here, if there is no interference, there is no difference between the two symbols theoretically. Therefore, subtracting the two neighboring symbols from each other and then squaring the subtracted results provides '0'. Otherwise, if there exists interference, subtracting the two neighboring symbols from each other and then squaring the subtracted results does not provide '0'. Accordingly, it is not possible to know interference energy (or power) of the presently received signal depending on this component (or information). Here, the interference energy is calculated using the value of every symbol received for one power control group, because the signal energy is calculated by extracting the PC bit from every traffic channel symbol received for one power control group. Therefore, an average SIR value for one power control group is determined by simply dividing the two values.

A decoder 309 decodes the traffic channel signal accumulated by the accumulator 308 and outputs received data. The interference energy and the signal energy measured in the unit of the power control group by the interference energy measurer and the signal energy measurer, respectively, are provided to an SIR calculator 370. The SIR calculator 370 calculates an SIR value by dividing the signal energy by the interference energy. The calculated SIR value is compared with a predetermined threshold and the compared results are provided to a transmitter, which transmits the compared results to the base station after multiplexing with the transmission data. By doing so, the forward power control operation is enabled.

Figure 3:
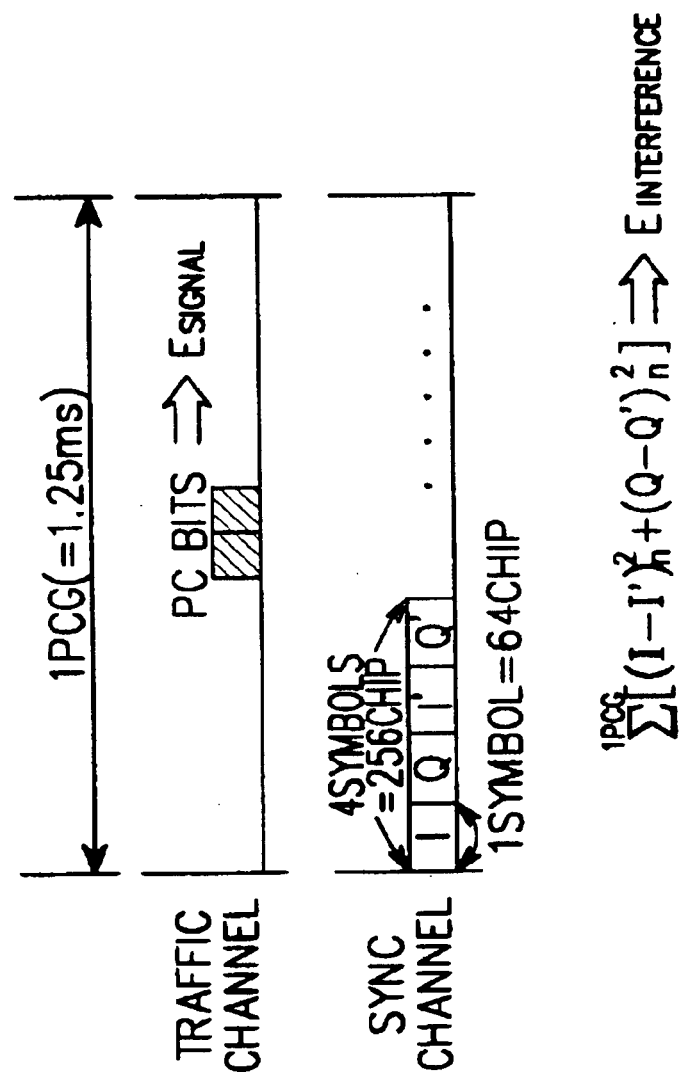
FIG. 3 is a diagram explaining an operation of measuring signal energy and interference energy according to an embodiment of the present invention.

FIG. 3 is a diagram for explaining an operation of measuring the signal energy and the interference energy according to an embodiment of the present invention.

Referring to FIG. 3, the operation of measuring the signal energy and the interference energy is performed in the unit of one power control group (PCG). For a rate set (RS) 1, the power control group is 1.25 ms, one symbol is comprised of 64 chips, and 4 symbols are comprised of 256 chips.

In the signal energy measurer, the accumulator 308 accumulates the traffic channel despread signal, and the PC bit extractor 360 extracts the PC bit from the resultant signal accumulated by the accumulator 308 and measures signal energy $E_{SIGNAL}$ within one power control group from the value of the extracted PC bit.

In the interference energy measurer, the accumulator 314 accumulates the sync channel despread signal, the subtractor subtracts from each other values of two neighboring symbols in the signal accumulated by the accumulator 314, and the squarer squares the resultant value subtracted by the subtractor, thereby to measure the interference energy $E_{INTERFERENCE}$ within one power control group. Here, the subtraction by the subtractor is separately performed on the I and Q arms, and the subtraction and squaring operations are performed on every symbol constituting one power control group. This can be expressed by Equation (1) below.

$$\sum^{1 PCG} [(I - I')_n^2 + (Q - Q')_n^2] = E_{INTERFERENCE} \quad (1)$$

where the neighboring two symbols are not identical to each other (i.e., I≠I' and Q≠Q'), and n indicates the number of symbol group of the sync channel. For example, one symbol group consists of four symbols and one power control group contains six symbol groups. That is, it is a positive number being 1≦n≦6.

FIG. 4 shows an SIR calculation apparatus for a forward power control operation according to another embodiment of the present invention. Specifically, FIG. 4 shows an example where the apparatus is implemented in the mobile station of the multi-carrier communication system supporting a plurality of carriers. It will be assumed herein that the multi-carrier communication system supports 3 carriers CARRIER1–CARRER3.

Referring to FIG. 4, PN despreaders 401–403 and 411–413 each multiply their associated received carrier signals by a PN code, and output a plurality of first and second PN despread signals. Here, the "received carrier signals" refer to the received carrier signals (or baseband spread signals) which have passed through the antenna 301, the circulator 302 and the RF processor 303 of FIG. 2. The PN despreaders 401–403 multiply the associated received carrier signals by the PN code and output the first PN despread signals, and the PN despreaders 411–413 multiply their associated received carrier signals by the PN code and output the second PN despread signals. First orthogonal code despreaders 421–423 multiply the first PN despread signals by the traffic channel ortogonal code and output traffic channel despread signals. Second orthogonal code despreaders 431–433 multiply the second PN despread signals by the sync channel orthogonal code and output sync channel dispread signals.

Signal energy measurers 441–443 accumulate their associated traffic channel despread signals, respectively, and extract PC bit values from the accumulated signals, to thereby measure signal energy levels according to the carriers. That is, the signal energy measurer 441 accumulates the traffic channel despread signal for the first carrier and extracts a PC bit value from the accumulated signal, to thereby measure a signal energy level of the first carrier. The signal energy measurer 442 accumulates the traffic channel despread signal for the second carrier and extracts a PC bit value from the accumulated signal, to thereby measure a signal energy level of the second carrier. The signal energy measurer 443 accumulates the traffic channel despread signal for the third carrier and extracts a PC bit value from the accumulated signal, to thereby measure a signal energy level of the third carrier. Each of the signal energy measurers 441–443, as shown in FIG. 2, includes the accumulator 308, the PC bit extractor 360 and the long code generator 350.

Interference energy measurers 451–453 measure interference energy levels according to the carriers by performing accumulation, subtraction and squaring on the sync channel despread signals. That is, the interference energy measurer 451 measures an interference energy level of the first carrier by performing accumulation, subtraction and squaring on the sync channel despread signal for the first carrier. The interference energy measurer 452 measures an interference energy level of the second carrier by performing accumulation, subtraction and squaring on the sync channel despread signal for the second carrier. The interference energy measurer 453 measures an interference energy level of the third carrier by performing accumulation, subtraction and squaring on the sync channel despread signal for the third carrier. Each of the interference energy measurers 451–453, as shown in FIG. 2, includes the accumulator 314 and the interference energy processor 340 (which is comprised of the subtractor and the squarer).

SIR calculators 461–463 each calculate SIR values according to the carriers by receiving the signal energy values and the interference energy values of the associated carriers, measured by the signal energy measurers 441–443 and the interference energy measurers 451–453. That is, the SIR calculator 461 calculates an SIR value for the first carrier by receiving the signal energy value for the first carrier measured by the signal energy measurer 441 and the interference energy value for the first carrier measured by the interference measurer 451. The SIR calculator 462 calculates an SIR value for the second carrier by receiving the signal energy value for the second carrier measured by the signal energy measurer 442 and the interference energy value for the second carrier measured by the interference measurer 452. The SIR calculator 463 calculates an SIR value for the third carrier by receiving the signal energy value for the third carrier measured by the signal energy measurer 443 and the interference energy value for the third carrier measured by the interference measurer 453. The SIR values for the respective carriers, calculated by the SIR calculators 461–463, are provided to their associated comparators shown in FIG. 6 which will be described later, and then, processed for the forward power control operation.

FIG. 5 shows an SIR calculation apparatus according to another embodiment of the present invention. Specifically, FIG. 5 shows an example where the apparatus is implemented in the mobile station of a multi-carrier communication system which supports multiple carriers (e.g., 3 carriers) and has multiple fingers (e.g., 3 fingers). That is, the SIR calculation apparatus shown in FIG. 5 is equivalent to a modified apparatus in which the SIR calculation apparatus of FIG. 4 is equally extended to the respective fingers (or groups).

Referring to FIG. 5, a first group (or first finger) of PN despreaders 501–506 multiply their associated received carrier signals for the first finger by the PN code and output first and second PN despread signals. Here, the "received carrier signal" refers to the received carrier signals (or baseband spread signals) which have passed through the antenna 301, the circulator 302, and the RF processor 303 of FIG. 2. The PN despreaders 501–503 multiply their associated received carrier signals for the first finger by the PN code and output the first PN despread signals, and the PN despreaders 504–506 multiply their associated received carrier signals for the first finger by the PN code and output the second PN despread signals. First orthogonal code (OC) despreaders 511–513 multiply the first PN despread signals by the traffic channel orthogonal code and output traffic channel despread signals. Second orthogonal code despreaders 514–516 multiply the second PN despread signals by the sync channel orthogonal code and output sync channel despread signals.

Signal energy measurers 521–523 accumulate their associated traffic channel despread signals for the first finger and extract PC bit values from the accumulated signals, to thereby measure signal energy levels of the first finger according to the carriers. That is, the signal energy measurer 521 accumulates the traffic channel despread signal for the first carrier in the first finger and extracts a PC bit value from the accumulated signal, to thereby measure a signal energy level of the first carrier in the first finger. The signal energy measurer 522 accumulates the traffic channel despread signal for the second carrier in the first finger and extracts a PC bit value from the accumulated signal, to thereby measure a signal energy level of the second carrier in the first finger. The signal energy measurer 523 accumulates the traffic channel despread signal for the third carrier in the first finger and extracts a PC bit value from the accumulated signal, to thereby measure a signal energy level of the third carrier in the first finger. Each of the signal energy measurers 521–523, as shown in FIG. 2, includes the accumulator 308, the PC bit extractor 360 and the long code generator 350.

Interference energy measurers 524–526 each measure interference energy levels for the respective carriers in the first finger by performing accumulation, subtraction and squaring on the sync channel despread signals for the first finger. That is, the interference energy measurer 524 measures an interference energy level of the first carrier in the first finger by performing accumulation, subtraction and squaring on the sync channel despread signal for the first carrier in the first finger. The interference energy measurer 525 measures an interference energy level of the second carrier in the first finger by performing accumulation, subtraction and squaring on the sync channel despread signal for the second carrier in the first finger. The interference energy measurer 526 measures an interference energy level of the third carrier in the first finger by performing accumulation, subtraction and squaring on the sync channel despread signal for the third carrier in the first finger. Each of the interference energy measurers 524–526, as shown in FIG. 2, includes the accumulator 314 and the interference energy processor 340 (which is comprised of the subtractor and the squarer).

A second group (or second finger) of PN despreaders 531–536 multiply their associated received carrier signals for the second finger by the PN code and output third and fourth PN despread signals. Here, the "received carrier signal" refers to the received carrier signals (or baseband spread signals) which have passed through the antenna 301, the circulator 302, and the RF processor 303 of FIG. 2. The PN despreaders 531–533 multiply their associated received carrier signals for the second finger by the PN code and output third PN despread signals, and the PN despreaders 534–536 multiply their associated received carrier signals for the second finger by the PN code and output fourth PN despread signals. Third orthogonal code despreaders 541–543 multiply the third PN despread signals by the traffic channel orthogonal code and output traffic channel despread signals. Fourth orthogonal code despreaders 544–546 multiply the fourth PN despread signals by the sync channel orthogonal code and output sync channel despread signals.

Signal energy measurers 551–553 accumulate their associated traffic channel despread signals for the second finger and extract PC bit values from the accumulated signals, to thereby measure signal energy levels of the second finger according to the carriers. That is, the signal energy measurer 551 accumulates the traffic channel despread signal for the first carrier in the second finger and extracts a PC bit value from the accumulated signal, to thereby measure a signal energy level of the first carrier in the second finger. The signal energy measurer 552 accumulates the traffic channel despread signal for the second carrier in the second finger and extracts a PC bit value from the accumulated signal, to thereby measure a signal energy level of the second carrier in the second finger. The signal energy measurer 553 accumulates the traffic channel despread signal for the third carrier in the second finger and extracts a PC bit value from the accumulated signal, to thereby measure a signal energy level of the third carrier in the second finger. Each of the signal energy measurers 551–553, as shown in FIG. 2, includes the accumulator 308, the PC bit extractor 360 and the long code generator 350.

Interference energy measurers 554–556 each measure interference energy levels for the respective carriers in the second finger by performing accumulation, subtraction and squaring on the sync channel despread signals for the second finger. That is, the interference energy measurer 554 measures an interference energy level of the first carrier in the second finger by performing accumulation, subtraction and squaring on the sync channel despread signal for the first carrier in the second finger. The interference energy measurer 555 measures an interference energy level of the second carrier in the second finger by performing accumulation, subtraction and squaring on the sync channel despread signal for the second carrier in the second finger. The interference energy measurer 556 measures an interference energy level of the third carrier in the second finger by performing accumulation, subtraction and squaring on the sync channel despread signal for the third carrier in the second finger. Each of the interference energy measurers 554–556, as shown in FIG. 2, includes the accumulator 314 and the interference energy processor 340 (which is comprised of the subtractor and the squarer).

A third group (or third finger) of PN despreaders 561–566 multiply their associated received carrier signals for the third finger by the PN code and output fifth and sixth PN despread signals. Here, the "received carrier signal" refers to the received carrier signals (or baseband spread signals) which have passed through the antenna 301, the circulator 302, and the RF processor 303 of FIG. 2. The PN despreaders 561–563 multiply their associated received carrier signals for the third finger by the PN code and output fifth PN despread signals, and the PN despreaders 564–566 multiply their associated received carrier signals for the third finger by the PN code and output sixth PN despread signals. Fifth orthogonal code despreaders 571–573 multiply the fifth PN despread signals by the traffic channel orthogonal code and output traffic channel despread signals. Sixth orthogonal code despreaders 574–576 multiply the sixth PN despread signals by the sync channel orthogonal code and output sync channel despread signals.

Signal energy measurers 581–583 accumulate their associated traffic channel despread signals for the third finger and extract PC bit values from the accumulated signals, to thereby measure signal energy levels of the third finger according to the carriers. That is, the signal energy measurer 581 accumulates the traffic channel despread signal for the first carrier in the third finger and extracts a PC bit value from the accumulated signal, to thereby measure a signal energy level of the first carrier in the third finger. The signal energy measurer 582 accumulates the traffic channel despread signal for the second carrier in the third finger and extracts a PC bit value from the accumulated signal, to thereby measure a signal energy level of the second carrier in the third finger. The signal energy measurer 583 accumulates the traffic channel despread signal for the third carrier in the third finger and extracts a PC bit value from the accumulated signal, to thereby measure a signal energy level of the third carrier in the third finger. Each of the signal energy measurers 581–583, as shown in FIG. 2, includes the accumulator 308, the PC bit extractor 360 and the long code generator 350.

Interference energy measurers 584–586 each measure interference energy levels for the respective carriers in the third finger by performing accumulation, subtraction and squaring on the sync channel despread signals for the third finger. That is, the interference energy measurer 584 measures an interference energy level of the first carrier in the third finger by performing accumulation, subtraction and squaring on the sync channel despread signal for the first carrier in the third finger. The interference energy measurer 585 measures an interference energy level of the second carrier in the third finger by performing accumulation, subtraction and squaring on the sync channel despread signal for the second carrier in the third finger. The interference energy measurer 586 measures an interference energy level of the third carrier in the third finger by performing accumulation, subtraction and squaring on the sync channel despread signal for the third carrier in the third finger. Each of the interference energy measurers 584–586, as shown in FIG. 2, includes the accumulator 314 and the interference energy processor 340 (which is comprised of the subtractor and the squarer).

SIR calculators 591–599 each calculate SIR values of the respective fingers according to the carriers by receiving the signal energy values and the interference energy values for the same carriers, measured by the signal energy measurers and the interference measurers provided for the respective fingers. That is, the SIR calculator 591 calculates an SIR value for the first carrier in the first finger by receiving the signal energy value and the interference energy value for the first carrier in the first finger. The SIR calculator 592 calculates an SIR value for the first carrier in the second finger by receiving the signal energy value and the interference energy value for the first carrier in the second finger.

The SIR calculator 593 calculates an SIR value for the first carrier in the third finger by receiving the signal energy value and the interference energy value for the first carrier in the third finger.

The SIR calculator 594 calculates an SIR value for the second carrier in the first finger by receiving the signal energy value and the interference energy value for the second carrier in the first finger. The SIR calculator 595 calculates an SIR value for the second carrier in the second finger by receiving the signal energy value and the interference energy value for the second carrier in the second finger. The SIR calculator 596 calculates an SIR value for the second carrier in the third finger by receiving the signal energy value and the interference energy value for the second carrier in the third finger.

The SIR calculator 597 calculates an SIR value for the third carrier in the first finger by receiving the signal energy value and the interference energy value for the third carrier in the first finger. The SIR calculator 598 calculates an SIR value for the third carrier in the second finger by receiving the signal energy value and the interference energy value for the third carrier in the second finger. The SIR calculator 599 calculates an SIR value for the third carrier in the third finger by receiving the signal energy value and the interference energy value for the third carrier in the third finger.

A summer 601 sums up the SIR values for the first carrier in the respective fingers, calculated by the SIR calculators 591–593 and outputs the summed value (i.e., average SIR value) as information for the forward power control operation. A summer 602 sums up the SIR values for the second carrier in the respective fingers, calculated by the SIR calculators 594–596 and outputs the summed value as information for the forward power control operation. A summer 603 sums up the SIR values for the third carrier in the respective fingers, calculated by the SIR calculators 597–599 and outputs the summed value as information for the forward power control operation.

Figure 6:
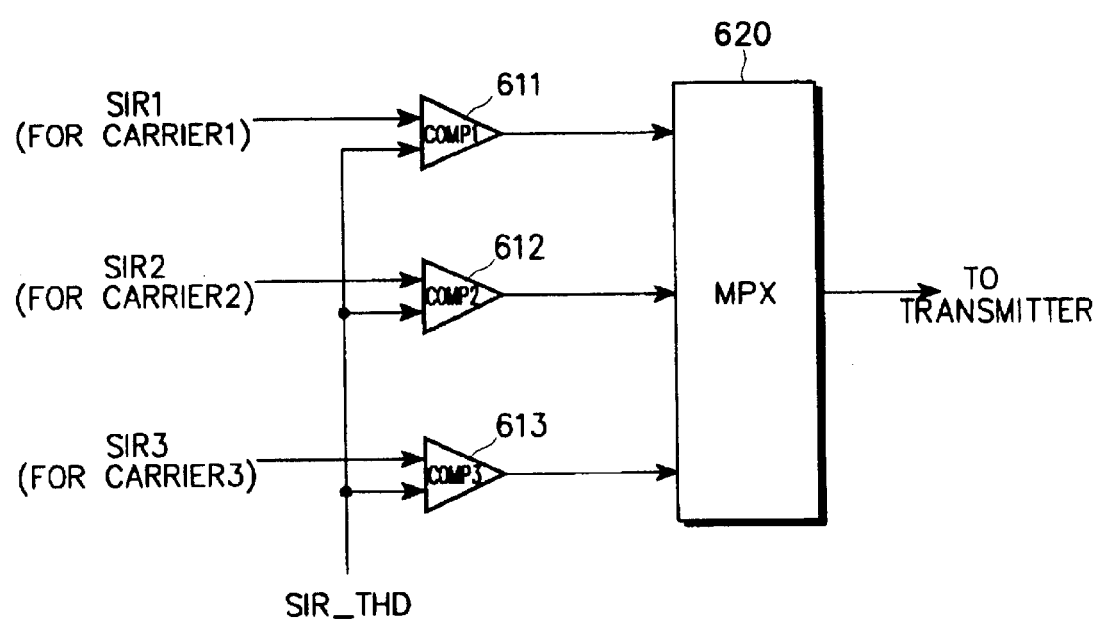
FIG. 6 is a block diagram illustrating a device for processing the SIR value calculated by the SIR calculating apparatus of FIGS. 4 and 5 to provide forward power control information.

FIG. 6 shows a device for processing the SIR values calculated by the SIR calculating apparatus of FIGS. 4 and 5 to provide forward power control information.

Figure 1:
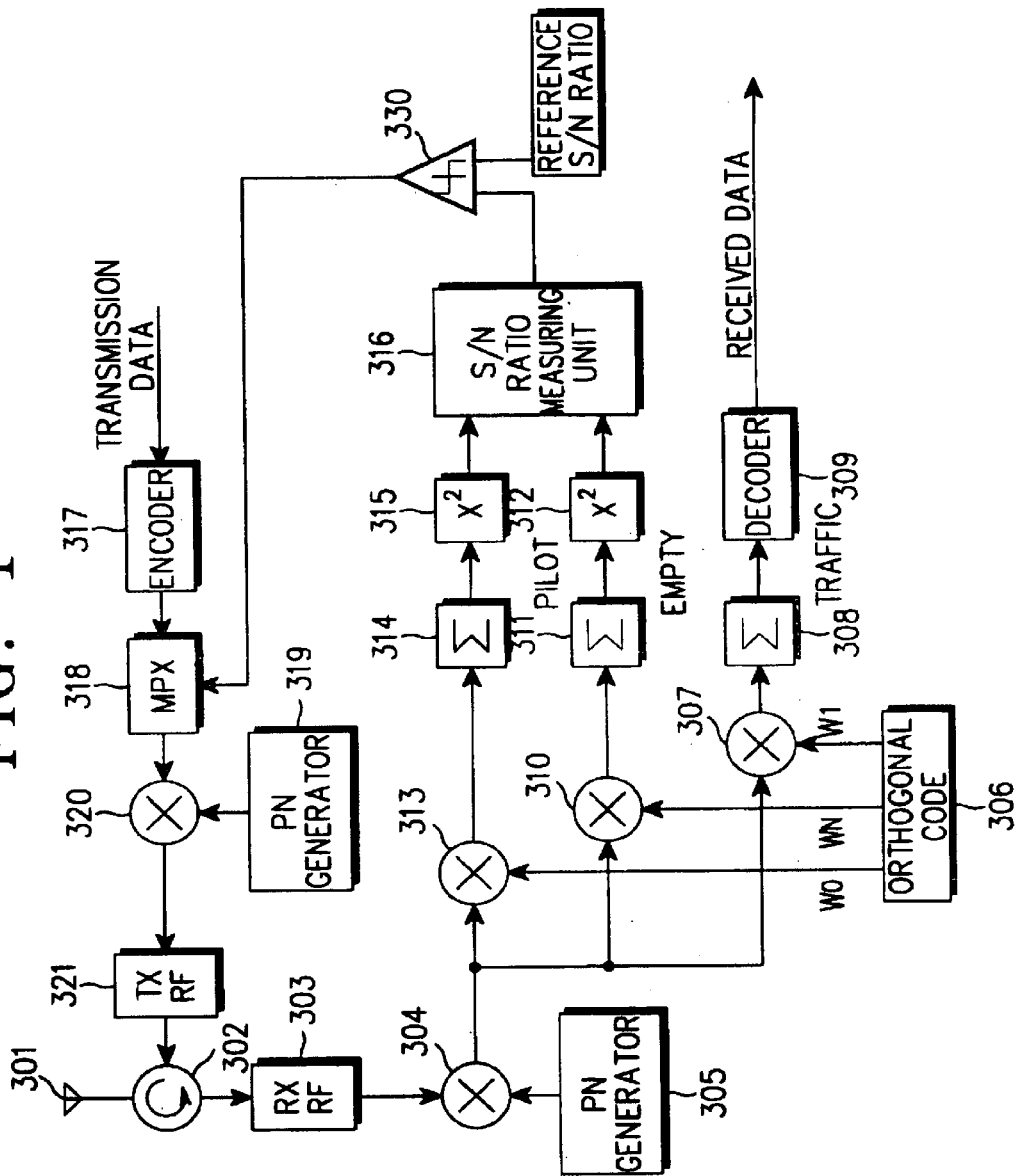
FIG. 1 is a block diagram illustrating a forward power control apparatus according to the prior art.

Referring to FIG. 6, comparators 611–613 each compare average SIR values of the respective carriers with a predetermined threshold SIR_THD and provide the compared results to a multiplexer (MPX) 620. If the average SIR values of the respective carriers are larger than the threshold SIR_THD, the corresponding comparators provide an output signal of '1'. Otherwise, if the average SIR values are smaller than the threshold SIR_THD, the corresponding comparators provide an output signal of '0'. The output signals of the comparators 611–613 are time-multiplexed by the multiplexer 620, and then provided to the transmitter as a power control command (or a power control bit). In the transmitter, the provided power control command, as shown in FIG. 1, is encoded by an encoder 317 and multiplexed with the transmission data by a multiplexer (MPX) 318. Thereafter, the multiplexed data is transmitted to the base station over a reverse pilot channel. The base station then can adaptively control transmission power of the corresponding carrier according to the received forward power control command. By doing so, it is possible to independently perform forward power control on the channels even though the respective carrier signals experience different fading according to the channels.

In addition, the device of FIG. 6 can provide the forward power control information in association with the SIR calculation apparatus of FIG. 2. In this case, only one comparator is required, and the comparator and the multiplexer have the same operation as described with reference to FIG. 6.

As described above, the present invention provides an apparatus and method for performing forward power control in a multi-carrier communication system such as the CDMA-2000 system. Since the novel apparatus can measure the interference energy on the sync channel without generating an orthogonal code for a separate channel, it is possible to efficiently utilize the channel, use of which is limited according to generation of the separate orthogonal code. In addition, it is possible to exactly predict an attenuation of the signal power due to multi-path fading which the respective carriers experience independently, by independently measuring the SIR values according to the carriers. Therefore, it is possible to perform accurate forward power control. Furthermore, since the interference energy is determined depending on the sync channel rather than on the pilot channel, it is possible to reduce the level of the interference energy which was measured to be relatively higher than the signal energy level. Accordingly, it is possible to perform accurate forward power control.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for calculating a signal-to-interference ratio (SIR) for a forward power control operation in a mobile station for a mobile communication system, comprising:

a PN (Pseudo Noise) despreader for multiplying a received signal by a unique PN code and outputting a PN despread signal;

an orthogonal code despreader for multiplying the PN despread signal by a sync channel orthogonal code and a traffic channel orthogonal code and outputting each of first and second orthogonal code despread signals;

an interference energy measurer for measuring interference energy by processing the first orthogonal code despread signal;

a signal energy measurer for measuring signal energy by processing the second orthogonal code despread signal; and an SIR calculator for calculating SIR depending on the measured signal energy and interference energy.

2. The apparatus as claimed in claim 1, wherein the PN despreader comprises:

a PN code generator for generating the PN code; and a multiplier for multiplying the received signal by the PN code and outputting the PN despread signal.

3. The apparatus as claimed in claim 1, wherein the orthogonal code despreader comprises:

an orthogonal code generator for generating the sync channel orthogonal code and the traffic channel orthogonal code;

a first multiplier for multiplying the PN despread signal by the sync channel orthogonal code and outputting the first orthogonal code despread signal; and a second multiplier for multiplying the PN despread signal by the traffic channel orthogonal code and outputting the second orthogonal code despread signal.

4. The apparatus as claimed in claim 1, wherein the interference energy measurer comprises:

an accumulator for accumulating the first orthogonal code despread signal;

a subtractor for subtracting from each other values of two neighboring symbols in the signal accumulated by the accumulator; and a squarer for squaring the subtraction signal by the subtractor to measure the interference energy.

5. The apparatus as claimed in claim 4, wherein the interference energy measurer measures the interference energy based on the following Equation:

$$\overset{1PCG}{Q}[(X-X')_n^2]$$

where PCG indicates a power control group, n the number of symbol groups contained in one power control group, and X and X' neighboring two symbols having different value, respectively.

6. The apparatus as claimed in claim 1, wherein the signal energy measurer comprises:
   an accumulator for accumulating the second orthogonal code despread signal; and
   a power control bit extractor for extracting a power control bit from the signal accumulated by the accumulator and measuring a value of the extracted power control bit as the signal energy.

7. The apparatus as claimed in claim 5, further comprising a long code generator for informing the power control bit extractor of a position of the power control bit in the signal accumulated by the accumulator in order to enable the power control bit extractor to use information about the position in extracting the power control bit.

8. The apparatus as claimed in claim 4, wherein the interference energy is measured in a unit of a power control group.

9. The apparatus as claimed in claim 5, wherein the signal energy is measured in a unit of a power control group.

10. An apparatus for calculating SIR for a forward power control operation in a mobile station of a multi-carrier communication system supporting multiple carriers, comprising:
    a first and second PN despreaders for multiplying associated received carrier signals respectively by a PN code and outputting first and second PN despread signals;
    a plurality of first orthogonal code despreaders for multiplying the first PN despread signals by a traffic channel orthogonal code and outputting traffic channel despread signals;
    a plurality of second orthogonal code despreaders for multiplying the second PN despread signals by a sync channel orthogonal code and outputting sync channel despread signals;
    a plurality of signal energy measurers for measuring signal energies of the respective carriers by processing the traffic channel despread signals;
    a plurality of interference energy measurers for measuring interference energies of the respective carriers by processing the sync channel despread signals; and
    a plurality of SIR calculators for calculating SIR values of the respective carriers by receiving the signal energies and the interference energies, measured by the signal energy measurers and the interference energy processors, and outputting the calculated SIR values as forward power control information.

11. The apparatus as claimed in claim 10, wherein each of the PN despreaders comprises:
    a PN code generator for generating the PN code; and
    a multiplier for multiplying the received carrier signal by the PN code and outputting the PN despread signal.

12. The apparatus as claimed in claim 10, wherein each of the signal energy measurers comprises:
    an accumulator for accumulating the traffic orthogonal code despread signal; and
    a power control bit extractor for extracting a power control bit from the signal accumulated by the accumulator and measuring a value of the extracted power control bit as the signal energy of the corresponding carrier.

13. The apparatus as claimed in claim 12, further comprising a long code generator for informing the power control bit extractor of a position of the power control bit in the signal accumulated by the accumulator in order to enable the power control bit extractor to use information about the position in extracting the power control bit.

14. The apparatus as claimed in claim 10, wherein each of the interference energy measurers comprises:
    an accumulator for accumulating the sync orthogonal code despread signal;
    a subtractor for subtracting from each other values of two neighboring symbols in the signal accumulated by the accumulator; and
    a squarer for squaring the subtraction signal by the subtractor to measure the interference energy of the corresponding carrier.

15. The apparatus as claimed in claim 14, wherein the interference energy measurer measures the interference energy based on the following Equation:

$$\overset{1PCG}{Q}[(X-X')_n^2]$$

where PCG indicates a power control group, n the number of symbol groups contained in one power control group, and X and X' neighboring two symbols having different value, respectively.

16. The apparatus as claimed in claim 11, wherein the signal energy is measured in a unit of a power control group.

17. The apparatus as claimed in claim 13, wherein the interference energy is measured in a unit of a power control group.

18. A forward power control apparatus for a multi-carrier communication system supporting multiple carriers and having multiple fingers, comprising:
    a plurality of first and second PN despreaders, included in the respective fingers, for multiplying associated received carrier signals by a PN code and outputting first and second PN despread signals;
    a plurality of first orthogonal code despreaders, included in the respective fingers, for multiplying the first PN despread signals by a traffic channel orthogonal code and outputting traffic channel despread signals;
    a plurality of second orthogonal code despreaders, included in the respective fingers, for multiplying the second PN despread signals by a sync channel orthogonal code and outputting sync channel despread signals;
    a plurality of signal energy measurers, included in the respective fingers, for measuring signal energies of the respective carriers by processing the traffic channel despread signals;
    a plurality of interference energy measurers, included in the respective fingers, for measuring interference energies of the respective carriers by processing the sync channel despread signals;
    a plurality of SIR calculators, included in the respective fingers, for calculating SIR values of the respective carriers in the respective fingers by receiving the signal energies and the interference energies, measured by the signal energy measurers and the interference energy measurers;

a plurality of summers for summing up the SIR values of the respective carriers in the respective fingers, calculated by the SIR calculators;

a plurality of comparators for comparing the SIR values of the respective carriers with a predetermined threshold and outputting a compared signal; and a multiplexer for multiplexing output signals of the respective comparators and outputting the multiplexed signals as forward power control information.

19. The apparatus as claimed in claim 18, wherein each of the PN despreaders comprises:

a PN code generator for generating the PN code; and a multiplier for multiplying the received carrier signal by the PN code and outputting the PN despread signal.

20. The apparatus as claimed in claim 18, wherein each of the signal energy measurers comprises:

an accumulator for accumulating the traffic orthogonal code despread signal; and a power control bit extractor for extracting a power control bit from the signal accumulated by the accumulator and measuring a value of the extracted power control bit as the signal energy of the corresponding carrier.

21. The apparatus as claimed in claim 20, further comprising a long code generator for informing the power control bit extractor of a position of the power control bit in the signal accumulated by the accumulator in order to enable the power control bit extractor to use information about the position in extracting the power control bit.

22. The apparatus as claimed in claim 18, wherein each of the interference energy measurers comprises:

an accumulator for accumulating the sync orthogonal code despread signal;

a subtractor for subtracting from each other values of two neighboring symbols in the signal accumulated by the accumulator; and a squarer for squaring the subtraction signal by the subtractor to measure the interference energy of the corresponding carrier.

23. The apparatus as claimed in claim 22, wherein the interference energy measurer measures interference energy based on the following Equation.

$$\overset{1PCG}{Q}[(X-X')_n^2]$$

where PCG indicates a power control group, n the number of symbol groups contained in one power control group, and X and X' neighboring two symbols having different value, respectively.

24. The apparatus as claimed in claim 18, wherein the signal energy is measured in a unit of a power control group.

25. The apparatus as claimed in claim 20, wherein the interference energy is measured in a unit of a power control group.

26. A method for performing forward power control in a mobile station of a mobile communication system, comprising the steps of:

(a) multiplying a received signal by a unique PN code and outputting a PN despread signal;

(b) multiplying the PN despread signal by a sync channel orthogonal code and a traffic channel orthogonal code and outputting first and second orthogonal code despread signals;

(c) measuring interference energy by processing the first orthogonal code despread signal;

(d) measuring signal energy by processing the second orthogonal code despread signal;

(e) calculating SIR depending on the measured signal energy and interference energy; and (f) comparing the calculated SIR with a predetermined threshold and transmitting a compared signal to a base station as a forward power control command.

27. The method as claimed in claim 26, wherein said step (a) comprises the steps of:

generating the PN code; and multiplying the received signal by the PN code and outputting the PN despread signal.

28. The method as claimed in claim 26, wherein said step (b) comprises the steps of:

generating the sync channel orthogonal code and the traffic channel orthogonal code;

multiplying the PN despread signal by the sync channel orthogonal code and outputting the first orthogonal code despread signal; and multiplying the PN despread signal by the traffic channel orthogonal code and outputting the second orthogonal code despread signal.

29. The method as claimed in claim 26, wherein said step (c) comprises the steps of:

accumulating the first orthogonal code despread signal;

subtracting from each other values of two neighboring symbols in the accumulated signal; and squaring the subtraction signal to measure the interference energy.

30. The method as claimed in claim 29, wherein the interference energy measurer measures the interference energy based on the following Equation:

$$\overset{1PCG}{Q}[(X-X')_n^2]$$

where PCG indicates a power control group, n the number of symbol groups contained in one power control group, and X and X' neighboring two symbols having different value, respectively.

31. The method as claimed in claim 26, wherein said step (d) comprises the steps of:

accumulating the second orthogonal code despread signal; and extracting a power control bit from the accumulated signal and measuring a value of the extracted power control bit as the signal energy.

32. The method as claimed in claim 31, wherein an extraction position of the power control bit in the accumulated signal is determined based on a long code.

33. The method as claimed in claim 26, wherein said steps (c) and (d) are performed in a unit of a power control group.

34. The method as claimed in claim 26, wherein said steps (a) to (f) are performed according to carriers.

35. The method as claimed in claim 26, wherein said steps (a) to (f) are performed according to carriers and fingers.

* * * * *